United States Patent [19]

Knight

[11] 4,041,450

[45] Aug. 9, 1977

[54] INTRUSION ALARM-IGNITION CONTROL SYSTEM FOR A MOTOR VEHICLE

[75] Inventor: James Knight, 1838 Hone Ave., Bronx, N.Y. 10460

[73] Assignee: Lawrence Peska Associates, New York, N.Y.

[21] Appl. No.: 566,948

[22] Filed: Apr. 10, 1975

[51] Int. Cl.² .............................................. B60R 25/10
[52] U.S. Cl. .................................... 340/64; 340/224; 180/114; 307/10 AT
[58] Field of Search ......................... 340/63, 64, 276; 307/10 AT; 200/42 R; 180/114

[56] References Cited

U.S. PATENT DOCUMENTS 3,893,069  7/1975  Mason ................................... 340/63

Primary Examiner—Alvin H. Waring

[57] ABSTRACT

An intrusion alarm ignition control system for a motor vehicle comprises a plurality activation switches adapted to be received in the frames of the doors, engine hood and trunk hood of the motor vehicle. Stop members are rotatably mounted in each frame, wherein the stop members prevent closure of the door, engine hood or trunk hood. Each stop member is activated by an electromagnetic element wired in series to each activation switch. An electric key lock switch contained in the body of the motor vehicle is wired in series to a transmitter unit having an antenna contained within the motor vehicle. Each of the series consisting of one activation switch and one electromagnetic element is wired in parallel between the battery of the motor vehicle and the electric key lock switch. An electromagnetic member is wired in series between the transmitter and the battery. A lever type electric switch adapted to be received in the ignition wire of the motor vehicle is open and closed by the electromagnetic member. A receiver unit of a stationary or pocket type is remotely located from the motor vehicle, wherein a signal device is associated with the receiver unit.

8 Claims, 6 Drawing Figures

INTRUSION ALARM-IGNITION CONTROL SYSTEM FOR A MOTOR VEHICLE

SUMMARY OF THE INVENTION

My present invention relates to a unique and novel intrusion alarm-ignition control system for a motor vehicle, wherein the system transmits a silent signal from the motor vehicle to a remotely located receiver upon attempted forced entry, as well as providing a means of preventing the starting of the motor vehicle and the closure of the opened door, engine hood or trunk hood.

A number of U.S. Pat. Nos. 3,665,312; 3,668,675; and 3,781,836 have employed variously designed alarm systems for motor vehicles, but these aforementioned patents are non-applicable to my present invention.

An object of my present invention is to provide an intrusion alarm ignition control system for a motor vehicle which transmits a signal to a remotely located receiver unit upon attempted forced entry, as well as providing a means of preventing closure of the opened door, engine hood, or trunk hood and also preventing current flow from the battery to the ignition system.

Another object of my present invention is to provide an intrusion alarm-ignition control system of simple disign and readily adaptable to existing cars.

Briefly, my present invention comprises a plurality of activation switches adapted to be received in the frames of the doors, engine hood and trunk hood of the motor vehicle. Stop members are rotatably mounted in each frame, wherein the stop members prevent closure of the door, engine hood or trunk hood. Each stop member is activated by an electromagnetic element wired in series to each activation switch. An electric key lock switch contained in the body of the motor vehicle is wired in series to a transmitter unit having an antenna contained within the motor vehicle. Each series consisting of an activation switch and electromagnetic element is wired in parallel between the battery of the motor vehicle and the electric key lock switch. An electromagnetic member is wired in series between the transmitter and the battery. A lever type electric switch adapted to be received in the ignition wire of the motor vehicle is open and closed by the electromagnetic member. A receiver unit of a stationary or pocket type is remotely located from the motor vehicle, wherein a signal device is associated with the receiver unit.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
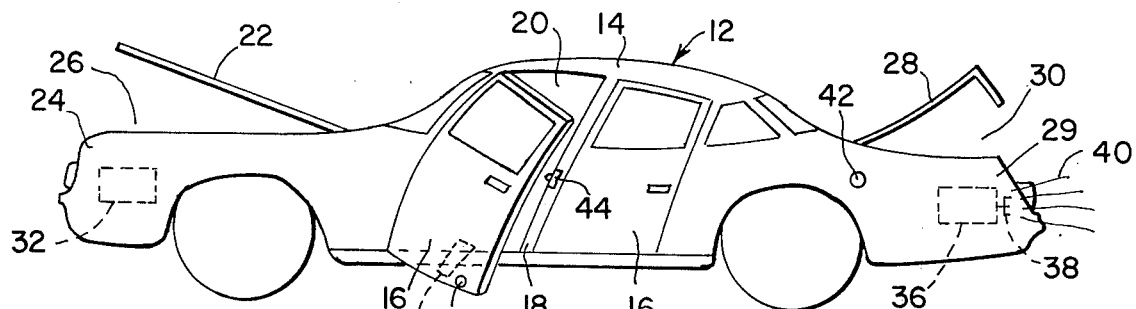
FIG. 1 illustrates a side view of a motor vehicle having an intrusion alarm-ignition control system.
Figures 2, 4, 5:
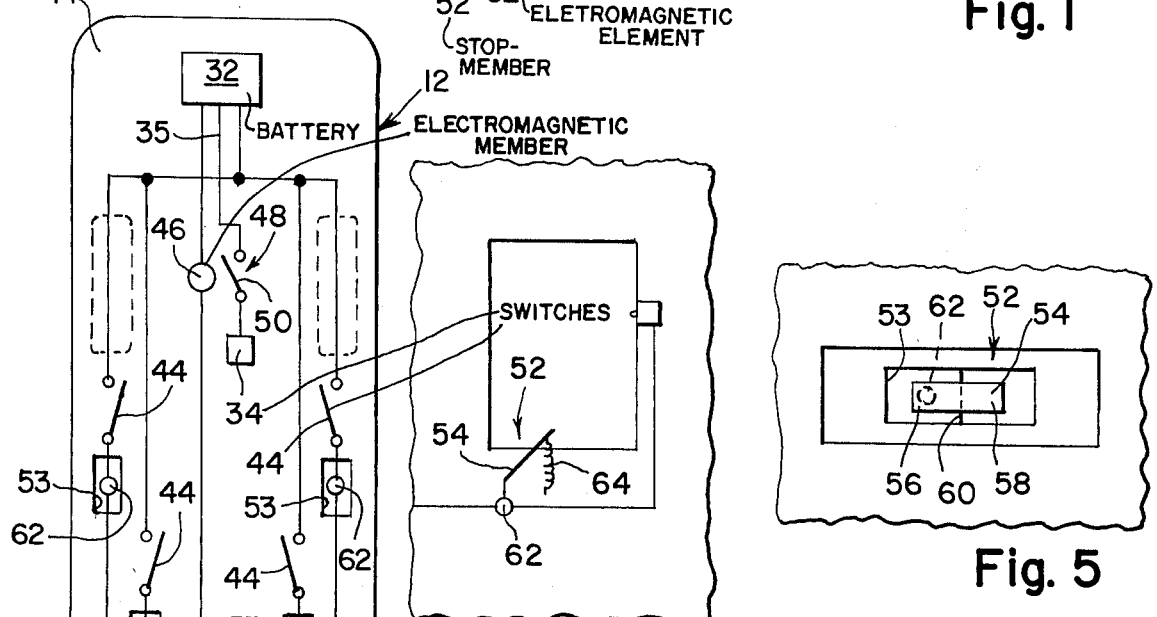
FIG. 2 illustrates a schematic circuit diagram of the system contained in the motor vehicle.
FIG. 4 illustrates a plan view of a stop member contained in a frame of a door of the motor vehicle.
FIG. 5 illustrates a cross sectional view of the stop member.

Turning now descriptively to the drawings, in which similar reference characters denote similar elements throughout the several views, FIGS. 1-2 shows an intrusion alarm-ignition control system 10 for a motor vehicle 12 having a body 14 with a plurality of doors 16 and their associated frames 18 and openings 20, an engine hood 22 and its associated frame 24 and opening 26, a trunk hood 28 and its associated frame and opening 30, a battery 32, an ignition switch 34 and an ignition wire 35 communicating between the battery 32 and ignition switch 34. A radio transmitter 36 having an associated antenna 38 is contained within the motor vehicle 12, wherein the transmitter 36 and antenna 38 emit a signal 40 of a given frequency. An electric key lock 42 is contained in the body 14 of the motor vehicle 12, wherein the lock 42 is wired in series to the transmitter 36. An activation switch 44 is disposed in each of frames 18 such that the opening of the doors 16, the engine hood 22 and the trunk hood 28 causes the activation switches 44 to be closed. An electromagnetic member 46 is wired in series between the battery 32 and the transmitter 36. A lever type electric switch member 48 is wired between the battery and the ignition switch 34. When the electromagnetic member 46 is activated, the electromagnetic member 46 opens the switch by magnetic attraction of the lever arm 50 of the switch 48 preventing the motor vehicle 12 from being started buy means of the ignition switch 34.

Figures 3, 3A:
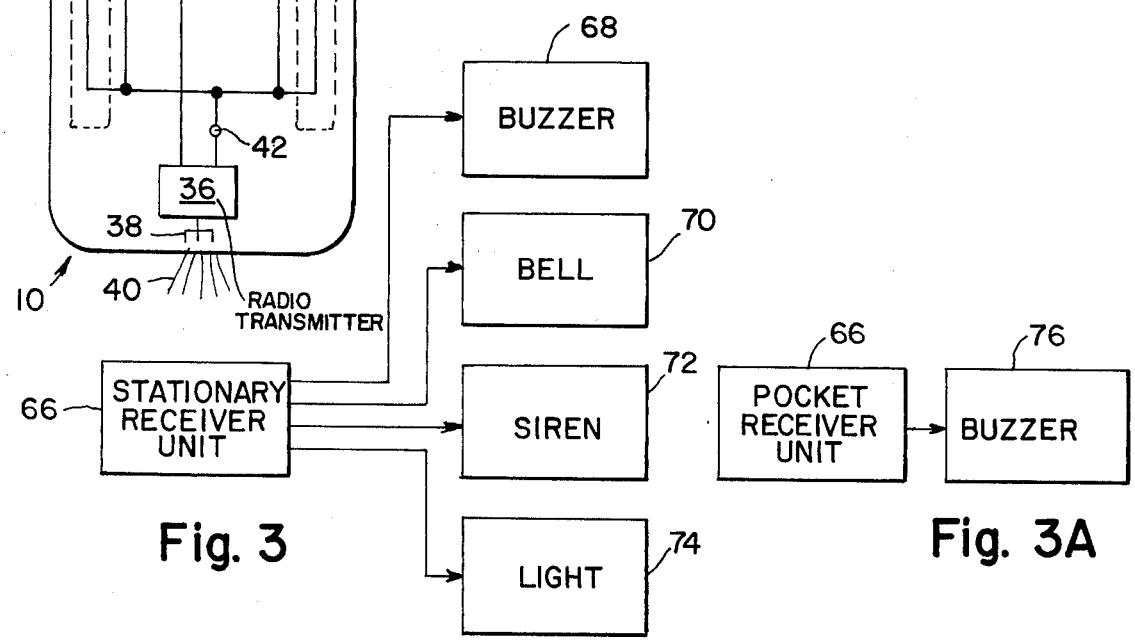
FIGS. 3 and 3A illustrates block diagrams receiving systems.

Referring to FIGS. 2, 3, each electromagnetic element 62 is wired in series to one activation switch 44. The combination of each switch 44 and electomagnetic element 62 are wired in parallel circuits between the battery and the electric key lock switch 42. A stationary receiver unit 66 is located remotely from the motor vehicle 12, wherein the receiver unit 66 activates a signal device such as a buzzer 68, a bell 70, a siren 72, or a light 74. Alternately (FIG. 3A) the receiver unit 66 can be a pocket type receiver, wherein the unit activates a buzzer 76.

FIGS. 4-5 show a metallic stop member 52 rotatably mounted into one of the frames 29, wherein a stop member 52 is contained in each frame 29. Each frame 29 has an elongated slot aperture 53 therethrough. The stop member 52 comprises an elongated bar 54 having a pair of ends 56, 58 and a transverse central pin 60 therethrough. The ends of the pin are rotatably mounted in suitable brackets contained centrally on the side edges of aperture 53. An electromagnetic element 62 is mounted within each frame 29 below one end of each bar 54. A coil spring 64 is contained within each frame 29 wherein the spring 64 is mounted onto the underface of the other end of the bar 54.

In use, the electric key lock switch 42 is closed. When a door 16, a engine hood 22, or trunk hood 28 is open, an activation switch 44 is closed. The closing of switch 44 causes electromagnetic element 62 and electromagnetic member 46 to become activated, wherein electromagnetic member 46 causes the opening of switch 48 in the ignition wire 35. The electromagnetic element 62 pulls downward the one end 56 of bar 54 into the appropriate frame 29 associated therewith and the rotation of the other end 58 of bar 54 into one of the openings. The other end of the bar 54 protruding into one of the openings prevents closing of a door 16, an engine bood 22, or a trunk hood 28, thereby preventing deactivation of the activation switch 44. The transmitter 36 emits a signal 40 to the receiver unit 66. The system can be completely deactivated by turning the key lock switch 42 to the off position, wherein the electromagnetic element 62 and electromagnetic member 46 are de-energized. The de-energization of element permits the coil 64 spring to pull the other end 58 of bar 54 downward into the appropriate frame 29, wherein the door 16, engine hood 22 or trunk hood 28 can be closed so as to open the appropriate activation switch.

Hence obvious changes may be made in the specific embodiment of the invention described herein, such modifications being within the spirit and scope of the invention claimed, it is indicated that all matter contained herein as intended as an illustrative and not as limiting in scope.

Having thus described the invention, what I claim as new and desire to secure by Letters Patent of the United States is:

1. An intrusion alarm ignition control system for a motor vehicle having a body with a plurality of doors and their associated frame and opening, a hood of said motor vehicle and its associated frame and opening, an engine hood and its associated frame and opening, an ignition wire communicating between a battery and an ignition switch of said motor vehicle, and each said associated frame having an elongated aperture therein, which comprises:
   a. a transmitter for transmitting a signal having an associated antenna adapted to be received in said motor vehicle;
   b. an electric key lock receivably disposed in said body of said motor vehicle;
   c. a plurality of activation switches adapted to be received in said frame, each said activation switch being activated upon opening of one of said doors, said engine hood, and said trunk hood;
   d. means for preventing closure of said doors, said engine hood, or said trunk hood, said means including an elongated bar having a pair of ends with a transverse central pin member extending through said elongated bar, the ends of said pin adapted to be rotatably received in said frame with said bar adapted to be rotatably received in said elongated aperture of said frame, an electromagnet element wired in series to each said activation switch, each said activation switch received in said aperture below one said end of said bar, a coil spring adapted to be received in each said aperture below said other end of each said bar and affixed onto said other end of said bar, and parallel circuits of each said series circuit of said electromagnet element and said activation switch wired between said battery and said electric key lock switch;
   e. means for preventing flow of current through said ignition wire upon activation of said activation switch, said means including an electromagnet member wired in series between said transmitter and said battery, a lever type electric switch member adapted to be received in said ignition wire, said electromagnetic member opening and closing said lever type electric switch upon the opening and closing of one of said activation switches;
   f. a receiver unit located remotely from said radio transmitter for receiving said signal; and
   g. a signal device associated with said receiver unit.

2. A system as recited in claim 1, wherein said receiver is a stationary type.

3. A system as recited in claim 2, wherein said signal device is an alarm.

4. A system as recited in claim 2, wherein said signal device is a bell.

5. A system as recited in claim 2, wherein said signal device is a siren.

6. A system as recited in claim 2, wherein said signal device is a light.

7. A system as recited in claim 1, wherein said receiver unit is a pocket type.

8. A system as recited in claim 1, wherein said signal device is a pocket type receiver.

* * * * *